United States Patent
Merchant et al.

(10) Patent No.: US 10,530,712 B2
(45) Date of Patent: Jan. 7, 2020

(54) HANDLING REFLEXIVE ACLS WITH VIRTUAL PORT-CHANNEL

(71) Applicant: Cisco Technology, Inc., San Jose, CA (US)

(72) Inventors: Sameer Dilip Merchant, Sunnyvale, CA (US); Sarang Dharmapurikar, Cupertino, CA (US); Praveen Jain, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 15/373,616

(22) Filed: Dec. 9, 2016

(65) Prior Publication Data

US 2018/0167338 A1    Jun. 14, 2018

(51) Int. Cl.
*H04L 29/06* (2006.01)
*H04L 12/931* (2013.01)
(Continued)

(52) U.S. Cl.
CPC ............ *H04L 49/70* (2013.01); *H04L 45/304* (2013.01); *H04L 45/38* (2013.01); *H04L 63/0218* (2013.01); *H04L 63/0254* (2013.01); *H04L 63/101* (2013.01); *H04L 63/1441* (2013.01); *H04L 63/166* (2013.01); *H04L 45/7457* (2013.01)

(58) Field of Classification Search
CPC ....... H04L 49/70; H04L 45/304; H04L 45/38; H04L 63/101; H04L 63/1441; H04L 45/7457
See application file for complete search history.

(56) References Cited

U.S. PATENT DOCUMENTS 6,487,605 B1 * 11/2002 Leung ................... H04W 8/12
                                                              370/331
6,651,096 B1    11/2003 Gai et al.
(Continued)

OTHER PUBLICATIONS

Cisco Press: "Cisco IOS Security 15 Configuration Guide, Release 12.2", Internet Citation, Aug. 5, 2005 (Aug. 5, 2005), pp. 1-155, XP002664157, Retrieved from the Internet: URL:http://www.cisco.com/en/US/docs/ios/122/security/configuration/guide/scfbook.pd.
(Continued)

*Primary Examiner* — Jason K Gee
*Assistant Examiner* — Ka Shan Choy
(74) *Attorney, Agent, or Firm* — Patterson + Sheridan, LLP (57) ABSTRACT

Techniques for providing a reflexive access control list (ACL) on a virtual switch are provided. Embodiments receive a first packet corresponding to a first network flow and a second packet corresponding to a second network flow. Upon determining that a SYN flag is set within the first packet, a first entry is created in the reflexive ACL for the first network flow. Upon determining that the first packet was received over a client port of the first physical switch, the first packet is forwarded to a second physical switch within virtual switch. Upon determining that the second packet has a SYN flag enabled, a second entry is created in the reflexive ACL. Finally, upon determining that the second packet was received from the second physical switch, the second packet is forwarded over an uplink port to a destination defined by the second packet.

20 Claims, 6 Drawing Sheets

(51) Int. Cl.
*H04L 12/725* (2013.01)
*H04L 12/721* (2013.01)
*H04L 12/743* (2013.01)

(56) References Cited

U.S. PATENT DOCUMENTS

| | | | |
|---|---|---|---|
| 7,971,244 B1 | 6/2011 | Kajekar et al. | |
| 8,767,549 B2 | 7/2014 | Kashyap et al. | |
| 9,306,837 B1* | 4/2016 | Jain | H04L 45/16 |
| 9,882,776 B2* | 1/2018 | Aybay | H04L 41/0813 |
| 9,935,834 B1* | 4/2018 | Baveja | H04L 41/0846 |
| 2005/0076138 A1 | 4/2005 | Sterne | |
| 2007/0271362 A1 | 11/2007 | Bamnolker | |
| 2007/0271632 A1 | 11/2007 | Damude et al. | |
| 2009/0041011 A1* | 2/2009 | Sheppard | H04L 63/306 |
| | | | 370/360 |
| 2015/0117445 A1* | 4/2015 | Koponen | H04L 41/0896 |
| | | | 370/389 |
| 2015/0237170 A1 | 8/2015 | Feng et al. | |
| 2017/0295516 A1* | 10/2017 | Gao | H04W 24/04 |

OTHER PUBLICATIONS

European Search Report for Application No. EP 17 18 3109 dated Mar. 6, 2018.
Wikipedia, "Multi-link trunking", retrieved Sep. 16, 2016, 8 pages. <https://en.wikipedia.org/wiki/Multi-link_trunking>.

* cited by examiner

501 — RECEIVE, AT A FIRST PHYSICAL SWITCH, A FIRST PACKET CORRESPONDING TO A FIRST NETWORK FLOW AND A SECOND PACKET CORRESPONDING TO A SECOND NETWORK FLOW, WHEREIN THE FIRST PHYSICAL SWITCH AND A SECOND PHYSICAL SWITCH ARE CONFIGURED TO FORM A VIRTUAL SWITCH, WHEREIN THE VIRTUAL SWITCH ACTS AS A SINGLE SWITCH WHEN INTERACTING WITH NEIGHBORING NETWORK DEVICES

502 — UPON DETERMINING THAT A FIRST SYN FLAG IS SET WITHIN A FIRST TCP HEADER OF THE FIRST PACKET: CREATE A FIRST ENTRY IN A REFLEXIVE ACCESS CONTROL LIST FOR THE FIRST NETWORK FLOW

503 — UPON DETERMINING THAT THE FIRST PACKET WAS RECEIVED OVER A CLIENT PORT, FORWARD THE FIRST PACKET TO THE SECOND PHYSICAL SWITCH

504 — UPON DETERMINING THAT A SECOND SYN FLAG IS SET WITHIN A SECOND TCP HEADER OF THE SECOND PACKET: CREATE A SECOND ENTRY IN THE REFLEXIVE ACCESS CONTROL LIST FOR THE SECOND NETWORK FLOW

505 — UPON DETERMINING THAT THE SECOND PACKET WAS RECEIVED FROM THE SECOND PHYSICAL SWITCH, FORWARD THE SECOND PACKET OVER AN UPLINK PORT TO A DESTINATION DEFINED BY THE SECOND PACKET

FIG. 5

HANDLING REFLEXIVE ACLS WITH VIRTUAL PORT-CHANNEL

TECHNICAL FIELD

Embodiments presented in this disclosure generally relate to computer networking. More specifically, embodiments disclosed herein relate to use of reflexive access control lists (ACL) on a virtual switch.

BACKGROUND

Reflexive ACLs are used to provide filtering of network traffic based on the session or network flow that a given packet belongs to. Frequently, organizations establish an internal network which they control, such as an intranet, and wish to link it to an external network through a limited number of routers or switches. By placing firewalls or filtering systems on these edge or border devices between the intranet and internet, the entire intranet can be protected. Reflexive ACLs block all traffic that originates outside of the intranet unless it is associated with a network flow that was initiated by a device that is within the intranet. In this way, external (potentially malicious) servers and devices are unable to access any devices or data within the intranet unless an intranet device explicitly wishes to allow such access.

Physical switches acting as a border device typically contain one or more ports on an "inside" interface, and one or more ports on an "external" interface. The internal interface ports connect to the intranet, and external interface ports connect to the wider network. Often, multiple physical switches are configured to operate as a single virtual switch, and devices on either side of the virtual switch interact with it as if it is a single switch rather than multiple switches. This provides additional failover capability, load-balancing, and increased bandwidth. Unfortunately, reflexive ACLs are configured to operate on a single physical switch, and do not work if applied to virtual switches.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Embodiments provide a method, network device, and computer program product for configuring reflexive ACLs for a virtual network device comprising two or more network devices. The method, network device, and computer program product include receiving, at a first physical switch, a first packet corresponding to a first network flow and a second packet corresponding to a second network flow, wherein the first physical switch and a second physical switch are configured to form a virtual switch, wherein the virtual switch acts as a single switch when interacting with neighboring network devices. Additionally, the method, network device, and computer program product include upon determining that a first SYN flag is set within a first TCP header of the first packet: creating a first entry in a reflexive access control list for the first network flow and upon determining that the first packet was received over a client port, forwarding the first packet to the second physical switch. The method, network device, and computer program product also include upon determining that a second SYN flag is set within a second TCP header of the second packet: creating a second entry in the reflexive access control list for the second network flow and upon determining that the second packet was received from the second physical switch, forwarding the second packet over an uplink port to a destination defined by the second packet.

Example Embodiments

Generally speaking, a network device (e.g., a network switch) is a computer device that connects network segments. A network device may operate at one or more layers including, for example, the physical layer, the data link layer, the network layer, and/or the transport layer. While four layers are described, it is to be appreciated that in different examples a switch may operate at all seven layers of the Open Systems Interconnection (OSI) stack. For instance, a network device may inspect data packets as they are received. In doing so, the network device may determine the source and destination of a packet and may forward it accordingly. Additionally, a network device may contain some intelligence beyond examine and forward logic. This intelligence facilitates having a network device perform some management functions. For example, a network device could selectively turn some port range on or off, may selectively establish and/or maintain priority settings for ports, may perform media access control (MAC) filtering to prevent MAC flooding, may use a spanning tree protocol, may perform link aggregation, may provide firewall services through reflexive ACLs, and so on. Typically, when these management functions are performed, they are performed in an actual (e.g., physical) network devices.

Generally, network devices are interconnected by communication links for transmitting data packets through physical ports. In order to provide increased network reliability, redundant switches (and links) are often included in a network. In the event that a switch (or link) fails, a redundant switch (or link) already in place within the network can quickly be enabled to replace the failed switch (or link). Since the redundant switch or link can typically be enabled as a replacement more quickly than the failed component can be replaced or repaired, having redundant links and/or switching provides a more reliable network.

Additionally, in order to provide redundancy or bandwidth, some networks bundle multiple physical links to operate as a single virtual link or logical channel. Such a group of physical links in the virtual link is referred to herein as a port-channel, a link aggregation bundle, and a link bundle. A number of protocols may be used to bundle two or more physical links or ports together to form a single logical channel. Examples of these protocols include Port Aggregation Protocol (PAgP) and IEEE 802.1AX Link Aggregation Control Protocol (LACP). These protocols are referred to generally herein as link aggregation protocols and it is to be understood that other protocols may be used without departing from the scope of the embodiments.

To further improve network reliability, two or more network devices may be grouped (or bundled) together into a single logical network device. In such an embodiment, the grouped network devices generally function as a single virtual network device. Moreover, such a virtual network device (e.g., a virtual switch) may appear to the network devices in the network to be a single network device. Examples of protocols for bundling network devices include, without limitation, virtual port channel (vPC) and virtual switching system (VSS). Additionally, the network devices within the virtual network device may communicate via one or more links (referred to herein as trunk links).

Although there are numerous advantages of network device teaming (e.g., a virtual switch created according to the vPC protocol), there are challenges as well. For instance, although reflexive ACLs work well on a single physical switch, they are not readily applicable on a virtual switch. As such, embodiments provide techniques for providing reflexive ACL services on a virtual switch.

As discussed above, users frequently wish to maintain a firewall or protection on border or edge network devices that operate as a link between a secure internal network and a larger external network. Reflexive ACLs can be used to achieve this. In order to use a reflexive ACL, a border network device is generally configured to drop all packets that it receives over an interface or port connected to the external network. In this way, no external device or user can reach the intranet. In order to maintain connectivity between the internet and intranet, the border device may be configured to scan for packets originating from a device on the internal network that request a link to a device on the external network. For example, the border network device might scan packets that arrive over one or more interfaces or ports connected to the internal network, and look for a SYN flag enabled in the TCP header for each packet.

Upon detecting a SYN flag enabled in a packet that originated from an internal device, the border network device may determine that the internal device is attempting to establish a connection with some external device. In order to enable network connectivity, the border device configures a reflexive ACL to allow packets originating from that particular external device to the particular internal device. For example, if the border device sees that internal device A has initiated a connection to external device B, the border device creates an entry in the reflexive ACL to allow packets that originate from device B that have a destination of device A. In some embodiments, the reflexive ACL entry is further limited to the specific ports used in the SYN packet. For example, if device A uses port Pa to send a SYN packet to device B over port Pb, then the border device configures the reflexive ACL to allow packets that originate at device B using port Pb with a destination of device A over port Pa. In this way, the border device allows the external device to send packets to the internal network only if an internal device initiated the connection.

Figure 3A:
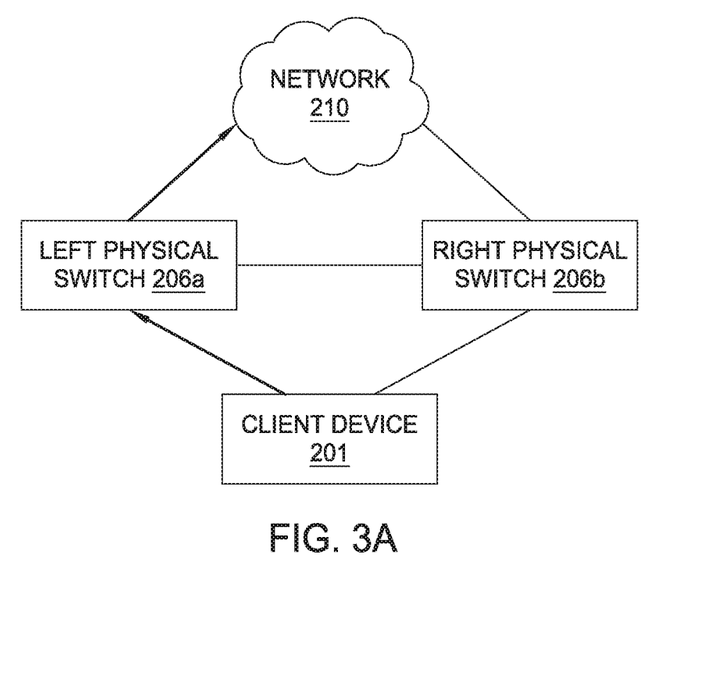
FIGS. 3A-D illustrate an example network flow within a networking environment, according to one embodiment disclosed herein.
Figure 3B:
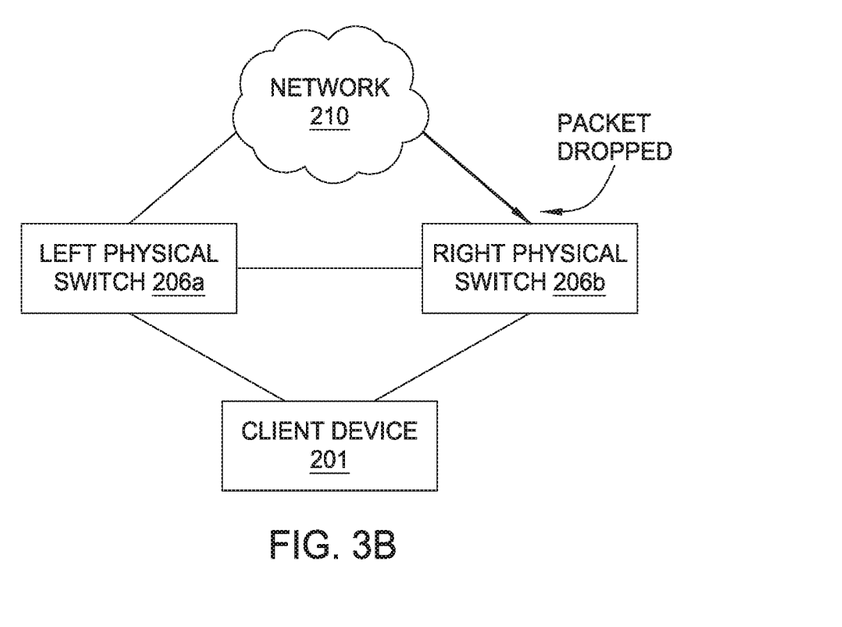

Reflexive ACLs do not work, however, with virtual switches. FIGS. 3A-B illustrate how a reflexive ACL fails to allow the reverse flow on a virtual switch. Client Device 201 sees Left Physical Switch 206a and Right Physical Switch 206b as a single virtual switch, and the links to each are treated as a single port-channel. Client Device 201 picks which link to send a request over based on a load-balancing algorithm or other configuration. In FIG. 3A, Client Device 201 has selected the link leading to Left Physical Switch 206a. Left Physical Switch 206a is configured, as any network switch, to forward the packet to a neighboring device in order to send it to its destination. As Left Physical Switch 206a is a border device implementing a reflexive ACL, it will also create the entry required to allow packets from the destination device to enter the internal network and go to Client Device 201. As illustrated in FIG. 3B, Network 210 may send return packets through either Left Physical Switch 206a or Right Physical Switch 206b. Similarly to above, neighboring devices on the external network see Left Physical Switch 206a and Right Physical Switch 206b as a single network device, and select a link based on load-balancing or other metrics. If the neighboring device on Network 210 selects Left Physical Switch 206a, the packet is forwarded because it matches an entry in Left Physical Switch 206a's reflexive ACL. As illustrated in FIG. 3B, however, if the return packet is sent to Right Physical Switch 206b, it will be dropped because it does not match an entry in Right Physical Switch 206b's reflexive ACL.

Figure 1:
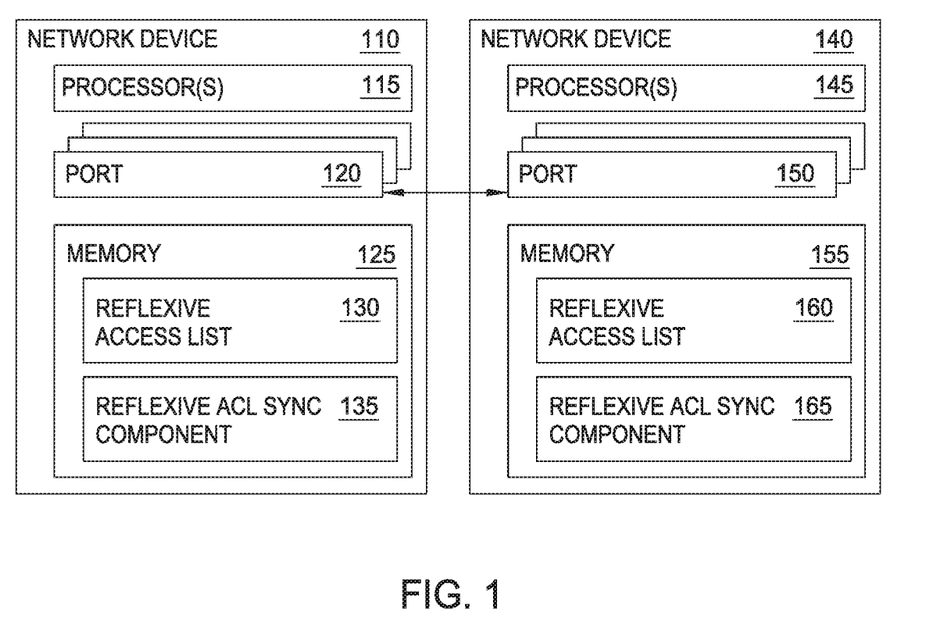
FIG. 1 illustrates a system configured with a reflexive ACL sync component, according to one embodiment described herein.

Turning to FIG. 1, a virtual switch is illustrated which comprises two network devices that are configured to solve the above discussed problem. As shown, the virtual network switch includes a Network Device 110 and a neighboring Network Device 140. The Network Device 110 includes one or more Processors 115, Communication Ports 120, and Memory 125. The Processor 115 may be any processing element capable of performing the functions described herein. The Processor 115 represents a single processor, multiple processors, a processor with multiple cores, and combinations thereof. The Memory 125 may be either volatile or non-volatile memory and may include RAM, flash, cache, disk drives, and the like. Additionally, the Memory 125 contains a Reflexive ACL Sync Component 135 and a Reflexive Access List 130. As discussed below, the Reflexive ACL Sync Component 135 is generally configured to ensure that the Reflexive Access List 130 and Reflexive Access List 165 on the neighboring Network Device 140 are kept in sync by forwarding packets based on their contents. Moreover, the Memory 125 could also contain network logic—e.g., a content addressable memory—for forwarding data in a communication network. The Network Device 110 may also include a control plane for configuring and managing the forwarding logic.

Figure 2:
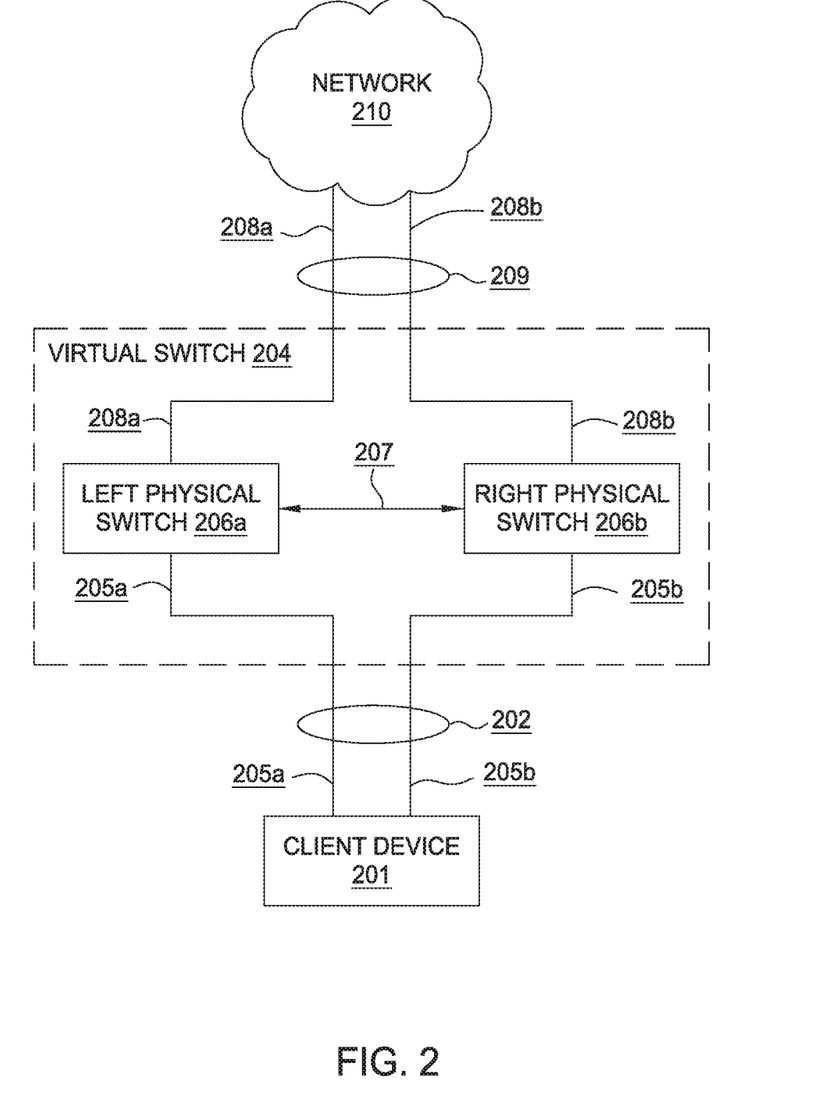
FIG. 2 illustrates an environment including a virtual switch configured with a reflexive ACL sync component, according to one embodiment disclosed herein.

FIG. 2 illustrates an environment implementing one embodiment described herein. As illustrated, Client Device 201 interacts with the Network 210 through Virtual Switch 204, which is a border device. There may be one or more other internal network devices (not pictured) between Client Device 201 and Virtual Switch 204, or Client Device 201 may be linked directly to Virtual Switch 204. As illustrated, Client Device 201 is configured to communicate with Virtual Switch 204 through links 205a and 205b. These links are bundled into a port-channel 202. Thus, Client Device 201 is configured to communicate with Virtual Switch 204 using port-channel 202, and selects one of the links 205a and 205b in port-channel 202 using a hash-based load balancing algorithm or any other method of using a port-channel. In some embodiments, there is only one link connecting Client Device 201 to each physical switch, but in some embodiments there are multiple links connecting to each physical switch. For example, port-channel 202 could comprise four physical links, two of which are connected to Left Physical Switch 206a and two of which are connected to Right Physical Switch 206b.

As illustrated in FIG. 2, although Virtual Switch 204 appears to be a single device to Client Device 201, Virtual Switch 204 actually comprises two physical devices: Left Physical Switch 206a and Right Physical Switch 206b. Link 205a and 205b both enable communication between Virtual Switch 204 and Client Device 201, but link 205a actually connects to Left Physical Switch 206a and link 205b actually connects to Right Physical Switch 206b. Similarly, link 208a provides connectivity between Left Physical Switch 208a and Network 210, and link 208b provides connectivity between Right Physical Switch 206b and Network 210. As discussed above, neighboring devices in Network 210 are configured to send packets to Virtual Switch 204 through port-channel 209, and select one of link 208a or link 208b based on a load balancing algorithms or any other method. In some embodiments, Left Physical Switch 206a is connected to Right Physical Switch 206b by a trunk link 207. In such an embodiment, Left Physical Switch 206a and Right Physical Switch 206b can communicate between themselves without sending data through any other devices. In other embodiments, trunk link 207 may not be available. In such an embodiment, Left Physical Switch 206a and Right Physical Switch 206b may be configured to communicate by sending data through one or more neighboring devices to each other, e.g., through Client Device 201 or through a device on Network 210.

As discussed above, Client Device 201 may send a SYN packet to Virtual Switch 204 using link 205a. If the neighboring device on Network 210 sends the return flow over link 208b, the packets will be dropped and no communication will occur. As such, embodiments of the present disclosure configure Left Physical Switch 206a to forward or bounce the SYN packet to Right Physical Switch 206b. The SYN packet may be forwarded over trunk link 207, if available, or through one or more neighboring network devices. Left Physical Switch 206a decides to bounce the SYN packet to Right Physical Switch 206b because the packet was received from Client Device 201, e.g., because it arrived at Left Physical Switch 206a over link 205a, which is connected to the internal network. After creating the reflexive ACL entry, therefore, the SYN packet is bounced to Right Physical Switch 206b. Right Physical Switch 206b then creates its own entry in its own reflexive ACL, and forwards the SYN packet to the Network 210 over link 208b. Right Physical Switch 206b does not bounce the SYN packet to Left Physical Switch 206a because it determines that the packet was received from Left Physical Switch 206a, e.g., over trunk link 207. In this way, both Left Physical Switch 206a and Right Physical Switch 206b see all outgoing SYN packets, and both create entries in their respective reflexive ACLs allowing the reverse network flow. Regardless of whether the neighboring device in Network 210 chooses link 208a or 208b, therefore, the network flow will be allowed.

Reflexive ACL entries are generally aged out and deleted if no packets arrive which match a respective entry. Thus if no response arrives from Network 210, the entry in both Left Physical Switch 206a's reflexive ACL and Right Physical Switch 206b's reflexive ACL will be deleted shortly. If the response is sent over link 208a, an entry was created unnecessarily in Right Physical Switch 206b's reflexive ACL, but it is deleted after a relatively short period of time because no return flow hits it. The corresponding entry in the reflexive ACL of Left Physical Switch 206a, however, will remain because packets associated with that flow continually hit it as they are sent from Client Device 201 to the Network 210, and from the Network 210 to Client Device 201. After some period of time without receiving a packet associated with the flow corresponding to the entry, the entry is deleted. The entry is similarly deleted if the flow is closed by the Client Device 201 or the destination device on the external network, e.g., if two sets of FIN flags are detected or a RST flag.

Figure 3C:
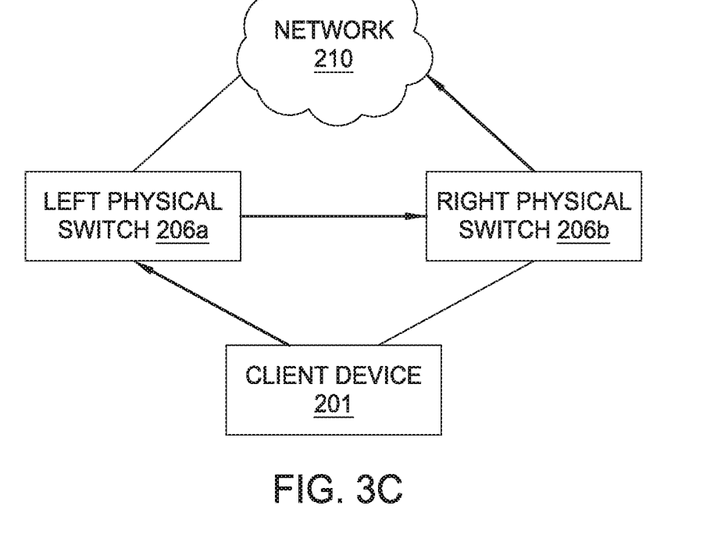
Figure 3D:
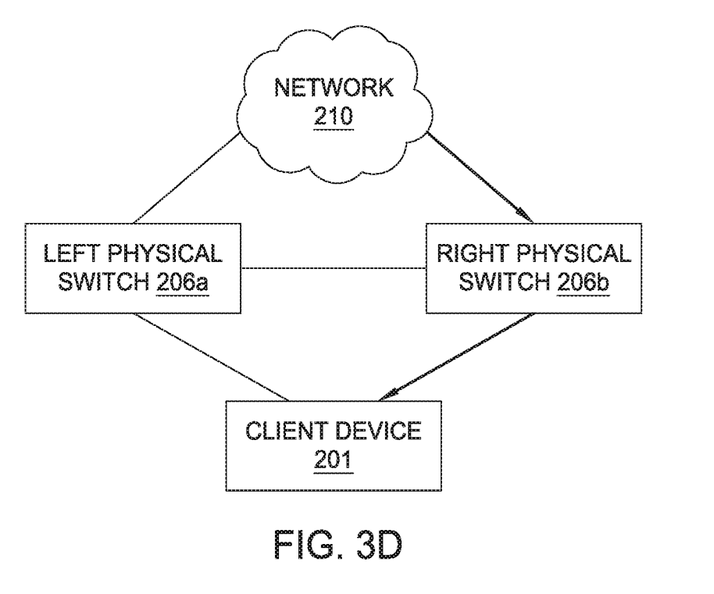

FIGS. 3C-D illustrate a network flow according to one embodiment. As illustrated, Client Device 201 sends a SYN packet to Left Physical Switch 206a. Because Left Physical Switch 206a determines that the packet was received from Client Device 201 (and not from Right Physical Switch 206b), it bounces it to Right Physical Switch 206b after creating an entry in its reflexive ACL. Right Physical Switch 206b then creates its own entry in its own reflexive ACL and forwards the SYN packet to the Network 210. As illustrated in FIG. 3D, when the return flow arrives at Right Physical Switch 206b, it is forwarded through to Client Device 201 because it matches the reflexive ACL entry which was created.

Generally, if the external device agrees to initiate a link, it responds to Client Device 201 with a packet that has the SYN flag enabled as well as the ACK flag. In some embodiments, this SYN+ACK packet is simply forwarded to Client Device 201 by whichever physical switch receives it. In some embodiments, however, there may be a concern that rogue devices within the internal network may flood the Virtual Switch 204 with SYN packets that are never accepted by an external device, and the reflexive ACLs may be overloaded with useless entries. Thus in some embodiments, the SYN+ACK packet is also bounced to both physical devices in order to prevent such flooding. In such an embodiment, when Left Physical Switch 206a and Right Physical Switch 206b have seen an outgoing SYN packet but have not received a corresponding SYN+ACK packet, the switches can be configured to aggressively timeout the entries in the reflexive ACLs (e.g., by setting a shorter timeout value for the reflexive ACL entries, relative to entries for which a corresponding SYN+ACK packet has been received). This allows entries associated with SYN packets which are never acknowledged to be deleted after a relatively brief period of time, and prevents a rogue internal device from overloading the reflexive ACLs.

In this embodiment, once the SYN+ACK packet corresponding to the SYN packet is received, the entry is updated with a relatively longer timeout period because it is a legitimate connection. In this embodiment, Left Physical Switch 206a and Right Physical Switch 206b are configured to bounce or forward SYN+ACK packets in much the same way as SYN packets. For example, if Left Physical Switch 206a determines that the SYN+ACK was received over link 208a, it will update its own entry in the reflexive ACL and bounce the SYN+ACK packet to Right Physical Switch 206b, e.g., over trunk link 207 or through a neighboring network device. If a physical switch determines that the SYN+ACK was received from the peer physical switch in the Virtual Switch 204, it will update its entry in its reflexive ACL, and forward the SYN+ACK packet to Client Device 201. In this way, reflexive ACL entries that are associated with a legitimate and ongoing connection have relatively longer timeout periods before they are deleted, whereas unacknowledged SYN packets that are not associated with a return network flow are deleted relatively more quickly.

Figure 4:
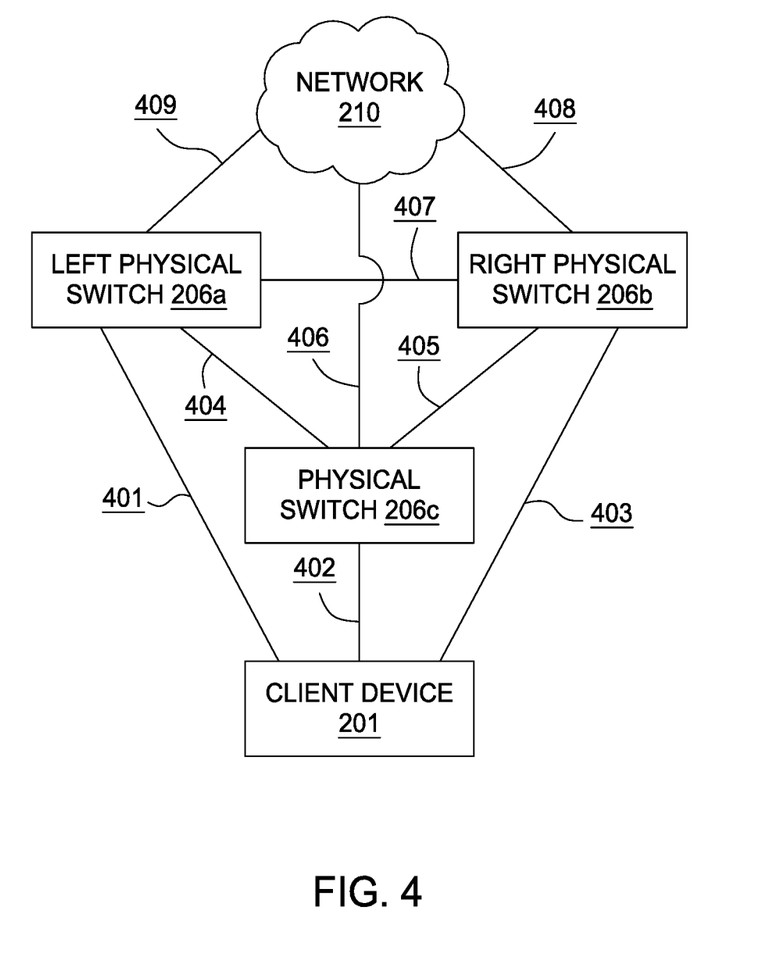
FIG. 4 depicts a block diagram of a virtual switch comprising three physical switches, according to one embodiment described herein.

FIG. 4 depicts an embodiment wherein the virtual switch comprising three physical switches. Although the illustrated embodiment shows three physical switches configured to act as a single virtual device, some embodiments of the present disclosure involve more than three physical switches. Such embodiments with more than three switches may be configured to operate in substantially the same logic as three switch embodiments. In the depicted embodiment, the physical switches 206a-c are configured to operate as a single virtual switch. As such, the physical switches 206a-c operate as a single network switch and appear to be a single network switch to neighboring network devices, e.g., Client Device 201.

In an embodiment where the virtual switch comprises three or more physical switches, each switch can be configured to bounce SYN packets that originated within the internal network that are received over an internal network port. If a SYN packet is received from a peer physical switch in the virtual switch, the physical switch is configured to determine whether it has already seen this SYN packet, e.g., by checking to see if a corresponding entry already exists in its reflexive ACL. If so, the physical switch forwards the SYN packet to the network. If not, the physical switch bounces the SYN packet to the next peer physical switch in the virtual switch. In this embodiment, each physical switch in the virtual switch is configured to bounce SYN packets to one particular peer physical switch, which guarantees that SYN packets do not skip a peer physical switch or cycle infinitely.

Exemplary sequences of events for a three-switch embodiment are now discussed with reference to FIG. 4. As above, Client Device 201 may select any of its links 401, 402, or 403 to send a packet. Regardless of which link is chosen, the Physical Switch 206a-c that receives the packet may create an entry in its respective reflexive ACL, and then bounce the link to the adjacent physical switch. This is because any SYN packet received from the Client Device 201 necessarily has not yet been seen by the peer physical switches. If link 401 is used by Client Device 201, Physical Switch 206a could bounce the packet over link 407 to Physical Switch 206b. Physical Switch 206b could then verify that it does not already has an entry for this flow in its own reflexive ACL, and create such an entry in its own reflexive ACL. Physical Switch 206b could bounce the SYN packet over link 405 to Physical Switch 206c. Physical Switch 206c could perform a similar verification and creation process, and could then bounce the packet over link 404 to Physical Switch 206a. Physical Switch 206a could determine that a reflexive ACL entry for the flow associated with the SYN packet has already been created at the Physical Switch 206a, and then forward the packet over link 409 to the Network 210 and ultimately to its destination.

In the illustrated embodiment of FIG. 4, each Physical Switch 206a-c is configured to bounce all SYN Packets to a single peer Physical Switch. For example, Physical Switch 206a is configured to determine whether the packet needs to be bounced, and if so, to bounce the packet over link 407 to Physical Switch 206b. In the depicted embodiment, Physical Switch 206a will not use link 404 to bounce SYN packets, but rather will receive SYN packets from Physical Switch 206c over link 404. In this way, embodiments can assure that SYN packets are not forwarded to the Network 210 until all Physical Switches 206a-c have seen it and created a reflexive ACL entry. Embodiments can similarly assure that SYN packets are never forwarded back and forth or in an infinite loop, because they always follow a preconfigured path.

As discussed above in reference to an embodiment comprising a virtual switch comprising two physical switches, SYN+ACK packets may also be treated similarly in an embodiment comprising three or more physical switches within a single virtual switch. In such an embodiment, when a physical switch receives a SYN+ACK packet, the physical switch forwards it to the client device if it has already seen that packet, and bounces it to a specific neighboring peer physical switch if it has not. In this way, reflexive ACLs can be implemented on virtual switches containing three or more physical switches.

Figure 5:
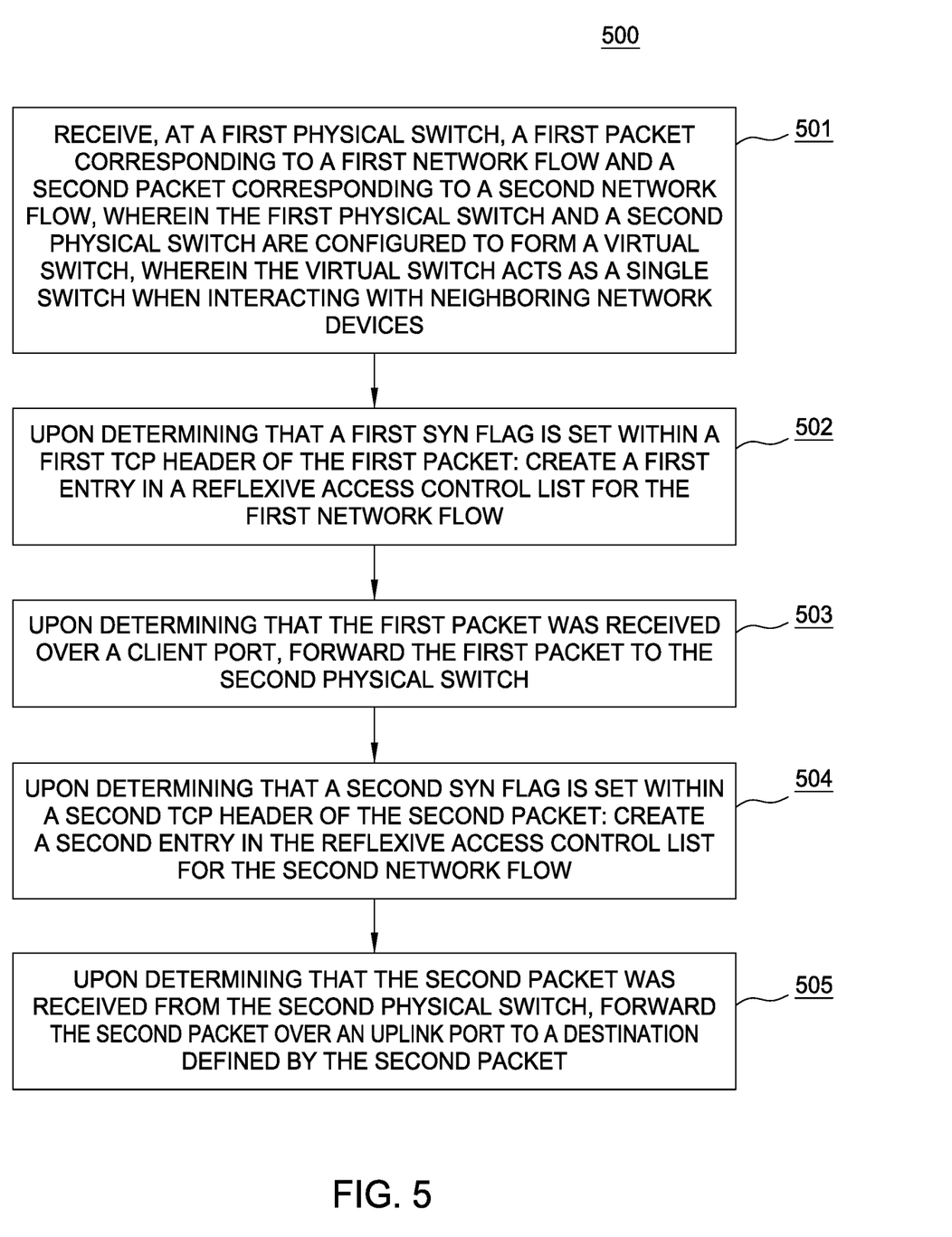
FIG. 5 is a flow diagram illustrating a method for providing a reflexive ACL for a virtual network switch, according to one embodiment disclosed herein.

FIG. 5 is a flow diagram illustrating a method 500 according to one embodiment herein. The method 500 begins at block 501, where a first physical switch receives a first packet corresponding to a first network flow and a second packet corresponding to a second network flow, wherein the first physical switch and a second physical switch are configured to form a virtual switch, wherein the virtual switch acts as a single switch when interacting with neighboring network devices. The method 500 proceeds to block 502, where, upon determining that a first SYN flag is set within a first TCP header of the first packet, the reflexive ACL sync component 135 on the first physical switch creates a first entry in a reflexive access control list for the first network flow. The method 500 continues at block 503, where the reflexive ACL sync component 135 on the first physical switch, upon determining that the first packet was received over a client port, forwards the first packet to the second physical switch.

The method 500 of FIG. 5 continues in block 504, where upon determining that a second SYN flag is set within a second TCP header of the second packet, the reflexive ACL sync component 135 on the first physical switch creates a second entry in the reflexive access control list for the second network flow. Finally, the method 500 terminates in block 505 where the reflexive ACL sync component 135 on the first physical switch, upon determining that the second packet was received from the second physical switch, forwards the second packet over an uplink port to a destination defined by the second packet.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method of reflexive access control list (ACL) management for multiple physical switches of a virtual switch, the computer-implemented method comprising:
   receiving, at a first physical switch, a first packet from a source, the first packet corresponding to a first network flow and specifying a destination, wherein the first physical switch and a second physical switch are configured to form the virtual switch, wherein the virtual switch acts as a single switch when interacting with neighboring network devices, wherein each of the first and second physical switches is configured to drop any packet received over an uplink port of the respective physical switch upon determining that no matching entry exists in a reflexive ACL of the respective physical switch; and
   upon determining that a first synchronization (SYN) flag is set within a first Transmission Control Protocol (TCP) header of the first packet: (i) permitting bidirectional traffic for the first network flow through the first physical switch, by updating the reflexive ACL of the first physical switch to include an entry for the first network flow; and (ii) upon determining that the first packet was received over a client port of the first physical switch, causing the second physical switch to permit bidirectional traffic for the first network flow through the second physical switch, including forwarding the first packet to the second physical switch by operation of one or more computer processors of the first physical switch;

wherein the second physical switch is configured to, upon receiving, over an uplink port of the second physical switch, a new packet from the destination and corresponding to the first network flow: (i) update a corresponding entry for the first network flow in the reflexive ACL of the second physical switch and (ii) forward the new packet to the source over a client port of the second physical switch.

2. The computer-implemented method of claim 1, wherein the virtual switch comprises a Virtual Port-Channel (vPC).

3. The computer-implemented method of claim 1, further comprising:

receiving, at the first physical switch, a second packet corresponding to the first network flow;

upon determining that a second SYN flag and a second ACK flag are set within a second TCP header of the second packet:

updating the first entry in the reflexive ACL of the first physical switch; and upon determining that the second packet was received over the uplink port, forwarding the second packet to the second physical switch.

4. The computer-implemented method of claim 1, wherein the first entry is associated with a timeout timer, and further comprising:

upon receiving a packet associated with the first flow, restarting the timeout timer; and upon determining the timeout timer has expired, deleting the first entry in the reflexive ACL of the first physical switch.

5. The computer-implemented method of claim 1, further comprising determining that a second packet was received from the second physical switch by determining that the second packet was received over a trunk port.

6. The computer-implemented method of claim 1, wherein a second packet is forwarded over the uplink port upon determining that the second packet was previously received at the first physical switch.

7. The computer-implemented method of claim 1, wherein causing the second physical switch to permit bidirectional traffic for the first network flow through the second physical switch prevents the second physical switch from dropping a subsequent packet corresponding to the first network flow due to no matching entry being found in the reflexive ACL of the second physical switch, wherein the second physical switch is further configured to, prior to receiving the new packet:

upon receiving the first packet forwarded from the first physical switch: (i) permit bidirectional traffic for the first network flow through the second physical switch, by updating the reflexive ACL of the second physical switch to include the corresponding entry for the first network flow, and (ii) forward the first packet over the uplink port of the second physical switch to the destination.

8. The computer-implemented method of claim 7, wherein the source comprises a requesting client, wherein the destination comprises a target server, wherein the computer-implemented method further comprises:

receiving, at a first physical switch, a second packet corresponding to a second network flow; and upon determining that a second SYN flag is set within a second TCP header of the second packet: (i) permitting bidirectional traffic for the second network flow through the first physical switch, by creating a second entry in the reflexive ACL and (ii) upon determining that the second packet was received from the second physical switch, which indicates that the reflexive ACL of the second physical switch has already been updated to include an entry permitting bidirectional traffic for the second network flow through the second physical switch, forwarding the second packet over an uplink port to a destination defined by the second packet, wherein the second packet was forwarded from the second physical switch to the first physical switch to permit bidirectional traffic for the first network flow through the first physical switch.

9. The computer-implemented method of claim 8, wherein the virtual switch comprises a Virtual Port-Channel (vPC), wherein each created entry is removable when the respective entry satisfies a predefined aging criterion, wherein each created entry is removable when the network flow corresponding to the created entry is closed;

wherein the computer-implemented method further comprises performing a protective operation to reduce an extent to which the reflexive ACLs can be overloaded via SYN packets from a rogue device operatively connected to the client ports of the first and second physical switches via a network, by aging out reflexive ACL entries for which synchronization acknowledgement (SYN-ACK) packets have not been received, more quickly than aging out reflexive ACL entries for which SYN-ACK packets have been received.

10. The computer-implemented method of claim 9, wherein the protective operation comprises:

receiving, at the first physical switch, a third packet corresponding to the first network flow;

upon determining that a third SYN flag and a third ACK flag are set within a third TCP header of the third packet: (i) updating the first entry in the reflexive access control list of the first physical switch; and (ii) upon determining that the third packet was received over the uplink port, forwarding the third packet to the second physical switch;

receiving, at the first physical switch, a fourth packet corresponding to the second network flow; and upon determining that a fourth SYN flag and a fourth ACK flag are set within a fourth TCP header of the fourth packet: (i) updating the second entry in the reflexive access control list of the first physical switch; and (ii) upon determining that the third packet was received from the second physical switch, forwarding the fourth packet over the client port to a destination defined by the fourth packet.

11. The computer-implemented method of claim 10, wherein prior to updating the first and second entries, the first and second entries are associated with a first timeout value, wherein updating the first and second entries comprises updating the first and second entries to have a second timeout value that is longer than the first timeout value;
wherein the first entry is associated with a timeout timer, wherein upon receiving a packet associated with the first flow, the timeout timer is restarted, wherein upon determining the timeout timer has expired, the first entry is deleted in the reflexive access control list of the first physical switch.

12. The computer-implemented method of claim 11, wherein determining that the second packet was received from the second physical switch comprises determining that the second packet was received over a trunk port, wherein forwarding the second packet over the uplink port is performed upon further determining that the second packet was previously received at the first physical switch;
wherein the virtual switch further includes a third physical switch, wherein bidirectional traffic for the first network flow is separately permitted through each of the first, second, and third physical switches.

13. A network device that provides reflexive access control list (ACL) management for a virtual network device, the network device comprising:
one or more computer processors; and
a memory containing a program that, when executed by the one or more computer processors, performs an operation comprising:
receiving, at the network device, a first packet from a source, the first packet corresponding to a first network flow and specifying a destination, wherein the network device comprises a first network device, wherein the first network device and a second network device are configured to form the virtual network device, wherein the virtual network device acts as a single network device when interacting with neighboring network devices, wherein each of the first and second network devices is configured to drop any packet received over an uplink port of the respective network device upon determining that no matching entry exists in a reflexive ACL of the respective network device; and
upon determining that a first synchronization (SYN) flag is set within a first Transmission Control Protocol (TCP) header of the first packet: (i) permitting bidirectional traffic for the first network flow through the first network device, by updating the reflexive ACL of the network device to include an entry for the first network flow; and (ii) upon determining that the first packet was received over a client port of the first network device, causing the second network device to permit bidirectional traffic for the first network flow through the second network device, including forwarding the first packet to the second network device;
wherein the second network device is configured to, upon receiving, over an uplink port of the second network device, a new packet from the destination and corresponding to the first network flow: (i) update a corresponding entry for the first network flow in the reflexive ACL of the second network device and (ii) forward the new packet to the source over a client port of the second network device.

14. The network device of claim 13, wherein the virtual network device comprises a Virtual Port-Channel (vPC).

15. The network device of claim 13, the operation further comprising:
receiving, at the first network device, a second packet corresponding to the first network flow;
upon determining that a second SYN flag and a second ACK flag are set within a second TCP header of the second packet:
updating the first entry in the reflexive ACL of the first network device; and
upon determining that the second packet was received over the uplink port, forwarding the second packet to the second network device.

16. The network device of claim 13, wherein the first entry is associated with a timeout timer, and the operation further comprising:
upon receiving a packet associated with the first flow, restarting the timeout timer; and
upon determining the timeout timer has expired, deleting the first entry in the reflexive ACL of the first network device.

17. The network device of claim 13, further comprising determining that a second packet was received from the second network device by determining that the second packet was received over a trunk port.

18. The network device of claim 13, wherein a second packet is forwarded over the uplink port upon determining that the second packet was previously received at the first network device.

19. A network device that provides reflexive access control list (ACL) management for a virtual network device, the network device comprising:
one or more computer processors; and
a memory containing a program that, when executed by the one or more computer processors, performs an operation comprising:
receiving, at the network device, a first packet from a source, the first packet corresponding to a first network flow and specifying a destination, the first packet having a first Transmission Control Protocol (TCP) header with a first synchronization (SYN) flag enabled, wherein the network device comprises a first network device, wherein the first network device and a second network device are configured to form a virtual network device that appears as a single network device to neighboring network devices, wherein the network device comprises a plurality of ports including (i) a trunk port connected to the second network device, (ii) a client port, and (iii) an uplink port, wherein the first packet was received from the second network device over the trunk port, wherein each of the first and second network devices is configured to drop any packet received over an uplink port of the respective network device upon determining that no matching entry exists in a reflexive ACL of the respective network device;
permitting bidirectional traffic for the first network flow through the first network device, by updating the reflexive ACL of the first network device to include an entry for the first network flow, wherein the entry is associated with a first timeout value;
forwarding the first packet over the uplink port to a destination specified by the first packet;
receiving, over the uplink port, a second packet comprising a second TCP header having a second SYN flag enabled and an acknowledgment (ACK) flag enabled;
upon determining that the second packet corresponds to the first network flow, updating the first entry in the reflexive ACL of the first network device to have a first updated timeout value that is longer than the first timeout value; and forwarding the second packet over the client port of the first network device;

wherein the second network device is configured to, upon receiving, over an uplink port of the second network device, a new packet from the destination and corresponding to the first network flow, forward the new packet to the source over a client port of the second network device.

20. The network device of claim 19, wherein the first packet is forwarded over the network port upon determining that the first packet was previously received by the first network device.

* * * * *